(12) United States Patent
Hong

(10) Patent No.: US 10,690,924 B2
(45) Date of Patent: Jun. 23, 2020

(54) DISPLAY SYSTEM AND IMAGE DISPLAY METHOD

(71) Applicant: BOE TECHNOLOGY GROUP CO., LTD., Beijing (CN)

(72) Inventor: Tao Hong, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/063,723

(22) PCT Filed: Dec. 12, 2017

(86) PCT No.: PCT/CN2017/115555
§ 371 (c)(1),
(2) Date: Jun. 19, 2018

(87) PCT Pub. No.: WO2018/196394
PCT Pub. Date: Nov. 1, 2018

(65) Prior Publication Data
US 2019/0331918 A1 Oct. 31, 2019

(30) Foreign Application Priority Data

Apr. 28, 2017 (CN) .......................... 2017 1 0296328

(51) Int. Cl.
*G02B 27/01* (2006.01)
*F21V 8/00* (2006.01)
*G06F 3/14* (2006.01)

(52) U.S. Cl.
CPC ......... *G02B 27/0172* (2013.01); *G02B 6/003* (2013.01); *G02B 6/0015* (2013.01);
(Continued)

(58) Field of Classification Search
CPC .. G02B 27/0172; G02B 6/0015; G02B 6/003; G02B 6/0035; G06F 3/1423
See application file for complete search history.

(56) References Cited

U.S. PATENT DOCUMENTS

| | | | |
|---|---|---|---|
| 2013/0162673 A1* | 6/2013 | Bohn ................. | G02B 27/0172 345/633 |
| 2013/0187943 A1* | 7/2013 | Bohn ................. | G02B 27/0093 345/619 |

(Continued)

FOREIGN PATENT DOCUMENTS

| | | |
|---|---|---|
| CN | 103389579 A | 11/2013 |
| CN | 104822060 A | 8/2015 |
| CN | 105867617 A | 8/2016 |

OTHER PUBLICATIONS

International Search Report dated Feb. 24, 2018.

*Primary Examiner* — Alexander Eisen
*Assistant Examiner* — Cory A Almeida
(74) *Attorney, Agent, or Firm* — Dilworth & Barrese, LLP; Michael J. Musella, Esq.

(57) ABSTRACT

A display system and an image display method are disclosed. The display system includes an image display device, an optical waveguide element, an image acquisition device and a calibration device. The image acquisition device is provided at the display side of the image display device, and is configured to be capable of simultaneously acquiring the surrounding image and the first image acquired by, the image acquisition device; and the calibration device is configured to obtain matching information based on the surrounding image and the first image.

18 Claims, 3 Drawing Sheets

(52) U.S. Cl.
CPC ......... *G02B 6/0035* (2013.01); *G06F 3/1423* (2013.01); *G02B 2027/014* (2013.01); *G02B 2027/0138* (2013.01); *G02B 2027/0178* (2013.01)

(56) References Cited

U.S. PATENT DOCUMENTS

| | | | |
|---|---|---|---|
| 2013/0250431 A1* | 9/2013 | Robbins | G02B 27/0172 359/633 |
| 2016/0007015 A1 | 1/2016 | Kim et al. | |
| 2018/0061133 A1 | 3/2018 | Wu | |

\* cited by examiner

DISPLAY SYSTEM AND IMAGE DISPLAY METHOD

TECHNICAL FIELD

Embodiments of present disclosure relates to a display system and an image display method.

BACKGROUND

An augmented Reality (AR) display system can achieve fusion of a virtual scene and the reality scene outside the display system through superimposing the virtual scene on the reality scene outside the display system. Therefore, an augmented reality display system can enhance users' cognitive ability to the real world, and improve the users' experience significantly. Because of the advantages of light weight, small volume and small thickness, the augmented reality display systems based on an optical waveguide have attracted widespread attention.

SUMMARY

An embodiment of present disclosure provides a display system. The display system comprises an image display device, an image acquisition device and a calibration device. At least part of the image display device is configured to be at least partially transparent, so as to at least partially receive a surrounding image for an opposite side of the image display device at a display side of the image display device; the image display device is further configured to display a first image received by the image display device at the display side; the image acquisition device is provided at the display side of the image display device, and is configured to be capable of simultaneously acquiring the surrounding image and the first image; and the calibration device is configured to obtain matching information based on the surrounding image and the first image acquired by the image acquisition device.

For example, in the display system provided by an embodiment of present disclosure, the display system further comprises an optical waveguide element. The optical waveguide element is configured to receive light of the first image, and transmit the light of the first image to the image display device, so as to allow the image display device to display the first image at the display side.

For example, in the display system provided by an embodiment of present disclosure, the calibration device is configured to obtain information regarding scene object in the surrounding image and information regarding image object in the first image, and obtain the matching information based on the information regarding the scene object and the information regarding the image object.

For example, in the display system provided by an embodiment of present disclosure, the display system further comprises a projection device; the projection device is configured to transmit the first image so as to allow the light of the first image is outputted into the optical waveguide element.

For example, in the display system provided by an embodiment of present disclosure, the display system further comprises a display element; the projection device is configured to align the light of the first image outputted by the display element into parallel light, and then transmit the light of the first image into the optical waveguide element.

For example, in the display system provided by an embodiment of present disclosure, the display system further comprises an image processing device, the image processing device is configured to output an image display signal for the display element.

For example, in the display system provided by an embodiment of present disclosure, the image processing device is configured to drive the display element to display the first image, and is further configured to drive the display element to refresh the first image based on the matching information.

For example, in the display system provided by an embodiment of present disclosure, the display system further comprises a controller; the controller is configured to control the first image outputted into the optical waveguide element according to the matching information.

For example, in the display system provided by an embodiment of present disclosure, the controller is configured to control the image display signal outputted by the image processing device according to the matching information, and to control the first image displayed by the display element according to the image display signal, so as to control the first image outputted into the optical waveguide element.

For example, in the display system provided by an embodiment of present disclosure, the optical waveguide element and the image display device are combined with each other, or integrally-formed, so as to obtain an optical waveguide body; the optical waveguide element comprises an image import structure, the image display device comprises an image export structure; and the optical waveguide body comprises a first end and a second end, the image import structure and the image export structure are arranged in the optical waveguide body.

For example, in the display system provided by an embodiment of present disclosure, the image import structure is configured to allow a propagation angle of the light of the first image to satisfy total reflection condition of the optical waveguide body.

For example, in the display system provided by an embodiment of present disclosure, the image import structure is arranged in the first end of the optical waveguide body, and is configured to import the light of the first image into the optical waveguide body by reflection.

For example, in the display system provided by an embodiment of present disclosure, the image export structure comprises a plurality of half-transparent and half-reflective surfaces arranged in parallel.

For example, in the display system provided by an embodiment of present disclosure, reflectivity of the plurality of half-transparent and half-reflective surfaces are increased sequentially, and reflectivity of the half-transparent and half-reflective surface closer to the second end is larger than reflectivity of the half-transparent and half-reflective surface closer to the first end.

For example, in the display system provided by an embodiment of present disclosure, the image acquisition device is arranged a position at the display side and corresponding to the second end of the optical waveguide body, and is opposite to the half-transparent and half-reflective surface close to the second end.

For example, in the display system provided by an embodiment of present disclosure, the display system further comprises a second image display device and a second optical waveguide element, at least part of the second image display device is configured to be at least partially transparent, so as to at least partially receive a surrounding image for an opposite side of the second image display device; and the second optical waveguide element is configured to receive light of the second image, and transmit the light of the second image to the second image display device, so as to allow the second image display device to display the second image at the display side.

For example, in the display system provided by an embodiment of present disclosure, the image display device and the second image display device are adjacent to each other and arranged in parallel.

For example, in the display system provided by an embodiment of present disclosure, the display system further comprises a second image acquisition device, the second image acquisition device is arranged at the display side of the second image display device, and is configured to be capable of simultaneously acquiring the surrounding image and the second image, which are outputted to the display side of the second image display device.

Another embodiment of present disclosure provides an image display method, the image display method comprises: receiving light of a first image, and transmitting the light of the first image to a display side; allowing light of a surrounding image for an opposite side to be capable of being outputted at the display side through transmission of light; and simultaneously acquiring the surrounding image and the first image at the display side.

For example, in the image display method provided by another embodiment of present disclosure, the image display method further comprises: obtaining matching information based on the surrounding image and the first image acquired; and controlling the first image based on the matching information.

BRIEF DESCRIPTION OF THE DRAWINGS

In order to clearly illustrate the technical solution of the embodiments of the disclosure, the drawings used in the description of the embodiments or relevant technologies will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
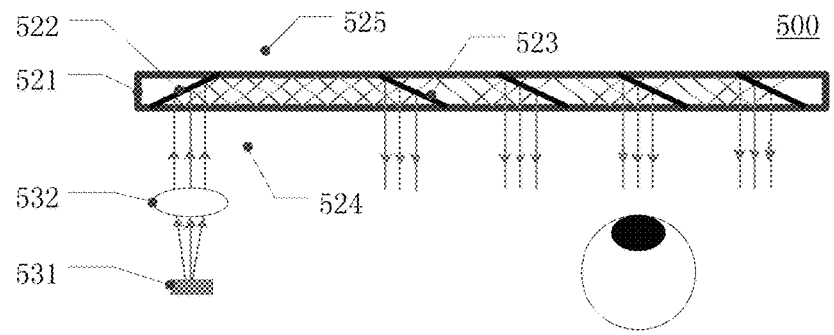
FIG. 1 is a display system based on an optical waveguide.

For example, FIG. 1 is a display system 500 based on an optical waveguide, and as illustrated in FIG. 1, the display system 500 based on the optical waveguide comprises an optical waveguide body 521, a projection device 532 and a micro-display 531. For example, the optical waveguide body 521 comprises one reflective surface 522 and, for example, four half-transparent and half-reflective surface 523, the four half-transparent and half-reflective surface 523 in combination can realize a display function and form a display device (optical waveguide), and the display device comprises a display side 524 as well as an opposite side 525, which is opposite to the display side 524.

For example, the light of an image outputted by the micro-display 531 is incident onto the reflective surface 522 of the optical waveguide body 521 after transmitted by the projection device 532, the reflective surface 522 of the optical waveguide body 521 allows an incident angle of at least part of the light of the image incident onto the reflective surface 522 to satisfy total reflection condition of the optical waveguide body 521, so as to allow the light of the image to be capable of transmitting from the left end of the optical waveguide body 521 to the right end of the optical waveguide body 521, and therefore, the optical waveguide body 521 is not required to be straight or flat in such a case. During the process that the light of the image is transmitted to the right end of the optical waveguide body 521 from the left end of the optical waveguide body 521, the light of the image is sequentially incident onto the four half-transparent and half-reflective surface 523. Part of the light of the image incident onto each half-transparent and half-reflective surface 523 is reflected by the half-transparent and half-reflective surface 523, so as to allow the propagation angle of the part of the light of the image to be changed by the half-transparent and half-reflective surface 523, and thus the part of the light of the image does not satisfy total reflection condition of the optical waveguide body 521 anymore, and then is outputted to the display side 524 of the optical waveguide body 521. Furthermore, at least part of the light forming the surrounding image for the outside scene at the opposite side 525 of the optical waveguide body 521 can pass through the optical waveguide body 521, and be outputted to the display side 524 of the optical waveguide body 521. Therefore, the user at the display side 524 of the optical waveguide body 521 can observe the surrounding image for the outside scene and the virtual image generated by the micro-display 531, and in this way the display system 500 can realize an augmented reality display function.

The inventor has noted that, in the above-mentioned display system 500 based on the optical waveguide, misalignment between the displayed image and the surrounding image can be present because real-time monitoring and adjustment processes are not performed to the displayed images and the surrounding image for the outside scene, and the effect of fusion of virtual and actual reality and the user experience are poor. Furthermore, the light efficiency of the display system 500 is low because a large proportional of light of the image cannot be outputted to the display side 524 of the optical waveguide body 521 after passing through the right-most half-transparent and half-reflective surface 523.

Embodiments of present disclosure provide a display system and an image display method, the effect of fusion of a displayed image and an outside scene is improved through simultaneously acquiring the surrounding image and the first image.

At least one embodiment of present disclosure provides a display system. The display system comprises an image display device, an optical waveguide element, and an image acquisition device. The image display device comprises a display side and an opposite side opposite to the display side, and at least part of the image display device is configured to be at least partially transparent, so as to at least partially receive the surrounding image for the opposite side at the display side of the image display device; the optical waveguide element is configured to receive light of the first image, and transmit the light of the first image to the image display device, so as to allow the image display device to display the first image at the display side; the image acquisition device is provided at the display side of the image display device, and is configured to be capable of simultaneously acquiring the surrounding image and the first image.

Figure 2A:
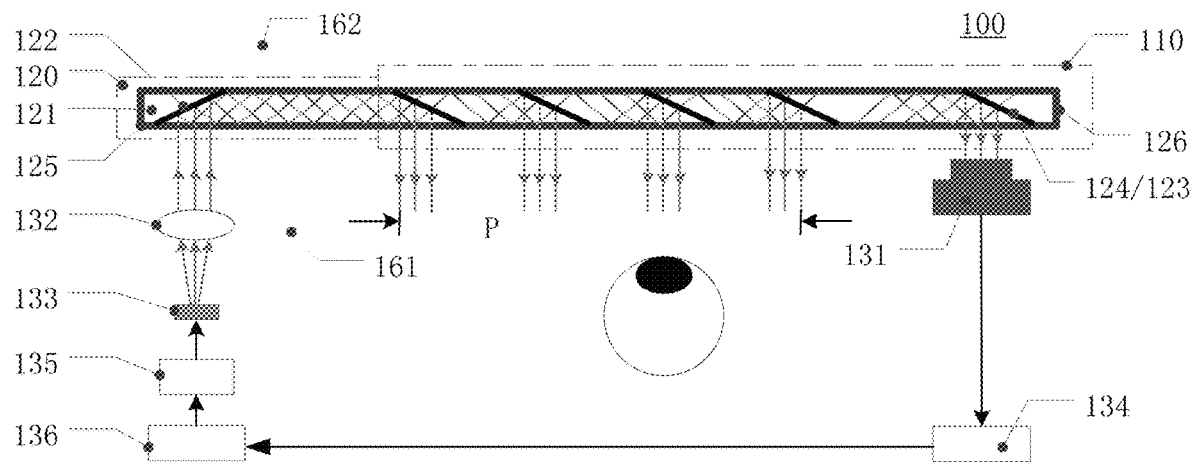
FIG. 2(a) is a cross-sectional view of a display system provided by an embodiment of present disclosure.
Figure 2B:
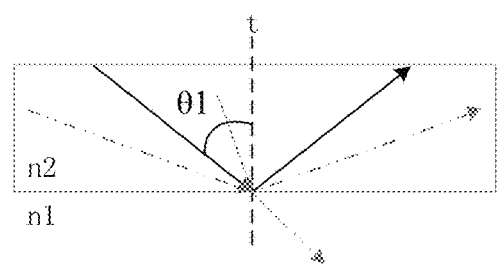
FIG. 2(b) a schematic diagram illustrating total reflection condition of an optical waveguide body in an embodiment of present disclosure.

For example, FIG. 2(*a*) is a cross-sectional view of a display system 100 provided by an embodiment of present disclosure. For example, as illustrated in FIG. 2(*a*), the display system 100 can comprise an image display device 110 and an image acquisition device 131. For example, according to specific implementation demands, the display system 100 can further comprise an optical waveguide element 120. For example, the display system 100 provided by an embodiment of present disclosure can be implemented as a monocular type augmented reality glasses. For example, as illustrated in FIG. 2(*a*), the image display device 110 can correspond to a left eye of a user; for another example, the image display device 110 can also corresponds to a right eye of the user.

For example, the image display device 110 can be an optical waveguide type display device, and the image display device 110 and the optical waveguide element 120 can be combined with each other after being separately formed, or alternatively, can be integrally formed. For example, as illustrated in FIG. 2(*a*), in the case that the optical waveguide element 120 and the image display device 110 are combined with each other or integrally formed, the integral structure thus obtained is an optical waveguide body 121, and the image display device 110 can comprise a middle region and a right region of the optical waveguide body 121. For example, at least part of the image display device 110 can be configured to be at least partially transparent, such that at least part of the surrounding image (i.e., an image generated by environment light) from an opposite side 162 of the image display device 110 can be received at a display side 161 of the image display device 110. For example, at least part of the light (for example, visible light) of the surrounding image for the scene at the opposite side 162 can pass through the image display device 110, such that the user can observe the surrounding image for the scene of the opposite side 162 at the display side 161.

For example, the optical waveguide element 120 can be configured to receive the light of the first image. For example, the first image can be outputted by the display element 133 and can be observed by the user. For example, the display element 133 can be a component of the display system 100 or can be additionally provided by the user. For the sake of clarity, details regarding the first image and the display element 133 will be described after the contents regarding the optical waveguide element 120 and the image acquisition device 131 are described.

For example, the optical waveguide element 120 is configured to be capable of transmitting the light of the first image to the image display device 110, such that the image display device 110 can display the first image at the display side 161. For example, the optical waveguide body 121 can comprise a first end 125 (for example, the left end illustrated in FIG. 2(*a*)) and a second end 126 (for example, the right end illustrated in FIG. 2(*a*)). For example, when the light of the first image received by the optical waveguide element 120 is coupled into the optical waveguide element 120, the propagation angle of at least part of the light of the first image can satisfy total reflection condition of the optical waveguide element 120 and the optical waveguide body 121, such that the at least part of the light of the first image can transmit from one end of the optical waveguide body 121 (for example, the first end 125) to another end of the optical waveguide body 121 (for example, the second end 126), therefore the light of the first image can transmit to the image display device 110, and the image display device 110 can display the first image at the display side.

For example, the concrete structures of the optical waveguide element 120 can be set according to specific implementation demands, and no limitations will be given to the embodiment of present disclosure in this respect.

For example, as illustrated in FIG. 2(*a*), the optical waveguide element 120 can comprise an image import structure 122, the image display device 110 can comprise an image export structure 123, and the image import structure 122 and the image export structure 123 can be arranged in the optical waveguide body 121.

For example, FIG. 2(*b*) is a schematic diagram illustrating total reflection condition of the optical waveguide body 121. For example, in the cast that the refractive index of the material of the optical waveguide body 121 is n2, and the refractive index of the material of the medium outside the optical waveguide body 121 is n1, when the propagation angle of the light in the optical waveguide body 121 (i.e., the angle θ1 between the light in the optical waveguide body 121 and the normal direction t of the display surface of the optical waveguide body 121) is larger than arcsin(n1/n2) (i.e., the critical angle of total reflection for the optical waveguide body 121), the light satisfies the total reflection condition of the optical waveguide body 121. For example, the critical angle of total reflection for the optical waveguide body 121 is decreased along with the increase of the refractive index n2 of the material of the optical waveguide body 121, that is, the greater the refractive index n2 of the material of the optical waveguide body 121 is, the easier it is for the light to satisfy the total reflection condition of the optical waveguide body 121.

For example, the material of the optical waveguide body 121 can be chosen according to specific implementation demands, and no limitations will be given to the embodiment of present disclosure in this respect. For example, the light loss caused by the material of the optical waveguide body 121 for visible light can be small (for example, the loss for visible light can be smaller than 0.2 dB/cm), such that the brightness of displayed images and the energy efficiency of the display system 100 can be improved. For example, the optical waveguide body 121 can be made of a material with a large refractive index, such that the critical angle of total reflection for the optical waveguide body 121 can be decreased and design flexibility of the display system 100 can be increased. For example, the refractive index n2 of the material for fabricating the optical waveguide body 121 can be 1.5-1.6; for example, the optical waveguide body 121 can adopt quartz glass or fluoride glass, but the embodiment of present disclosure are not limited to this case.

For example, the image import structure 122 can be configured to allow the propagation angle of the light of the first image (for example, at least part of the light of the first image) to satisfy the total reflection condition of the optical waveguide body 121. For example, the image import structure 122 can be a kind of reflective surface, but the embodiment of present disclosure is not limited to this case. For example, the reflective surface can be a multilayer dielectric film, but the embodiment of present disclosure is not limited to this case. For example, the image import structure 122 can have a high reflectivity for visible light (for example, the reflectivity for visible light is larger than 99.9%).

For example, in the case that the image import structure 122 is a reflective surface, the light of the first image incident onto the image import structure 122 can be reflected by the image import structure 122 so as to change the propagation direction (or the angle) and to be imported into the optical waveguide body 121. For example, in the case that the propagation angle of the light, which is in the optical waveguide body 121, of the first image satisfies the total reflection condition of the optical waveguide body 121, the light of the first image can be propagated in the optical waveguide body 121.

For example, the setting angle of the image import structure 122 (for example, the reflective surface) can be determined according to specific implementation demands, and no limitations will be given to the embodiment of present disclosure in this respect. For example, the angle between the image import structure 122 and the surface (for example, the surface illustrated in FIG. 3(a)) of the optical waveguide element 120 can set to be 25 degrees, but the embodiment of present disclosure is not limited to this case; the angle between the image import structure 122 and the surface of the optical waveguide element 120 can also set to be other angles, as long as the image import structure 122 allows the propagation angle of the light, which is reflected by the image import structure 122, of the first image (for example, at least part of light of the first image) to satisfy the total reflection condition of the optical waveguide element 120.

For example, in order to allow the display system 100 to be more compact, the image import structure 122 can be set in an end of the optical waveguide body 121, but the embodiment of present disclosure is not limited to this case. For example, the setting position of the image import structure 122 can correspond to the setting position of the display element 133. For example, the image import structure 122 need to be capable of receiving the light of the first image outputted by the display element 133.

For example, the image export structure 123 of the image display device 110 can be configured to transmit part of the light, which is incident onto the image export structure 123, of the first image to the display side 161 of the image display device 110 through reflection, and the image export structure 123 is further configured to allow part of the light, which is incident onto the image export structure 123, of the surrounding image to be outputted to the display side 161 of the image display device 110 by the way of light transmission. For example, the outgoing angle of the light, which is outputted to the display side 161 and illustrated in FIG. 2(a), of the first image is only an example, and the embodiment of present disclosure is not limited to this case. For example, the image export structure 123 can comprise a plurality of half-transparent and half-reflective surfaces 124 arranged in parallel. For example, the number, reflectivity, and settings of the half-transparent and half-reflective surfaces 124 comprised by the image export structure 123 can be set according to specific implementation demands, and no limitations will be given to the embodiment of present disclosure in this respect.

For example, the image export structure 123 can comprise two half-transparent and half-reflective surfaces 124. For example, one half-transparent and half-reflective surface 124 can be arranged in the middle region of the optical waveguide body 121 (for example, the center of the optical waveguide body 121) and can be used for exporting the light of the first image to the eye(s) of the user at the display side; the other half-transparent and half-reflective surface 124 can be arranged, for example, in the second end 126 of the optical waveguide body 121, and can be used for exporting the light of the first image to the light collecting surface of the image acquisition device 131 arranged at the display side.

For another example, the image export structure 123 also can comprise five half-transparent and half-reflective surfaces 124. For example, four half-transparent and half-reflective surfaces 124 can be arranged in the middle region of the optical waveguide body 121 (for example, the four half-transparent and half-reflective surfaces 124 can be arranged symmetrically with respect to the symmetric axis along the length direction of the optical waveguide body 121) and can be used for exporting the light of the first image to the eye(s) of the user at the display side; one half-transparent and half-reflective surface 124 can be set, for example, in the second end 126 of the optical waveguide body 121, and can be used for exporting the light of the first image to the light collecting surface of the image acquisition device 131 arranged at the display side. For example, in the case that the middle region of the optical waveguide body 121 is arranged with the plurality of half-transparent and half-reflective surfaces 124, the exit pupil (that is, the diameter P of the outputted beam illustrated in FIG. 2(a)), of the display system 100 can be increased, and thus the user experience can be improved.

For example, in the case that the setting angles of the plurality of half-transparent and half-reflective surfaces 124 of the image export structure 12 are equal, the matching information, in size and position, between the scene image and the first image coupled out of the plurality of half-transparent and half-reflective surfaces 124 can correspond to each other (for example, can be same). For example, the matching information, in position and size, between the surrounding image and the first image acquired by the image acquisition device 131 can be respectively the same as the matching information, in position and size, between the surrounding image and the first image observed by the user.

Therefore, the matching information between the surrounding image and the first image acquired by the image acquisition device 131 can be used in improving the matching degree of the surrounding image and the first image observed by the user, and thus the effect of fusion of the images displayed by the display system 100 and the surrounding image can be improved. Furthermore, because the image acquisition device 131 can utilize part of light, which is not reflected by, for example, the four half-transparent and half-reflective surfaces 124 illustrated in the left side of FIG. 2(a), the energy efficiency of the display system 100 provided by an embodiment of present disclosure can be increased.

For example, the reflectivity values of the plurality of half-transparent and half-reflective surfaces 124 can be increased sequentially, and the reflectivity of the half-transparent and half-reflective surface 124 closer to the second end 126 is larger than the reflectivity of the half-transparent and half-reflective surface 124 closer to the first end 125, such that the homogeneity of the intensity of the light outputted by the display system 100 can be increased. For example, as illustrated in FIG. 2(a), in the case that the image export structure 123 comprises five half-transparent and half-reflective surfaces 124, the reflectivity values of the half-transparent and half-reflective surfaces 124 arranged in parallel from the first end 125 to the second end 126 can be sequentially set to be 13%, 14.9%, 17.6%, 21.3% and 27.1%, but the embodiment of present disclosure is not limited to this case.

Figure 3A:
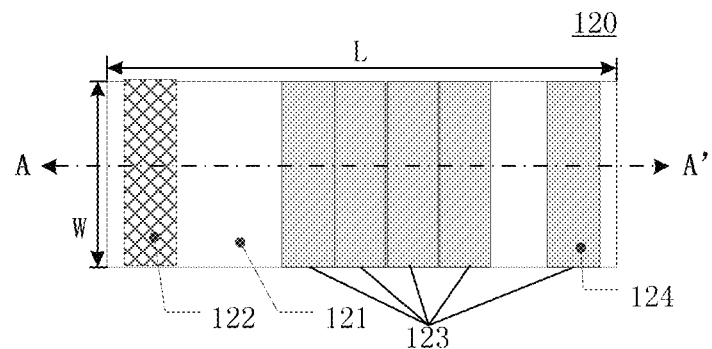
FIG. 3(a) is a plan view of an optical waveguide body in an embodiment of present disclosure.
Figure 3B:
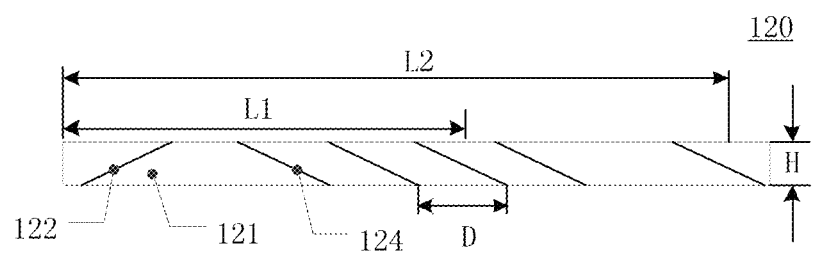
FIG. 3(b) is a cross-sectional view of the optical waveguide body illustrated in FIG. 3(a), obtained along line A-A'.

For example, FIG. 3(a) and FIG. 3(b) are a plan view and a cross-sectional view of an optical waveguide body 121 provided by an embodiment of present disclosure, and the cross-sectional view illustrated in FIG. 3(b) is obtained along line A-A' illustrated in FIG. 3(a). For example, in a case that the optical waveguide body 121 comprises a reflective surface and a plurality of half-transparent and half-reflective surfaces 124, the structure parameters of the optical waveguide body 121 can be set according to the following example, but the embodiment of present disclosure is not limited to this example.

For example, as illustrated in FIG. 3(a) and FIG. 3(b), the length L, the width W, and the thickness H of the optical waveguide body 121 can be respectively set to be 50 mm, 28 mm and 2.5 mm. For example, in order to allow the user to view a seamless image, no gap exists between the orthographic projections of the plurality of half-transparent and half-reflective surfaces 124 on the display surface of the optical waveguide body 121. For example, as illustrated in FIG. 3(a), the right border of the orthographic projection of the left most half-transparent and half-reflective surface 124 on the display surface of the optical waveguide body 121 (i.e., the display surface of the image display device 110) immediately abut the left border of the orthographic projection of the second half-transparent and half-reflective surface 124 from left to right on the display surface of the optical waveguide body 121, such that the user experience can be improved. For example, the angle between the half-transparent and half-reflective surface and the display surface of the optical waveguide body 121 can be set to be 25 degrees. For example, the widths D of the orthographic projections of the half-transparent and half-reflective surfaces 124 on the display surface of the optical waveguide body 121 can be set to be 5.36 mm. For example, the symmetric axis in the length direction of the orthographic projection of the third half-transparent and half-reflective surface 124 from left to right on the display surface of the optical waveguide body 121 can coincide with the symmetric axis in the length direction of the optical waveguide body 121, that is, the distance L1 between the first end 125 and the symmetric axis in the length direction of the orthographic projection of the third half-transparent and half-reflective surface 124 from left to right on the display surface of the optical waveguide body 121 can be set to be 25 mm. For example, the distance L2 between the first end 125 and the symmetric axis in the length direction of an orthographic projection of the fifth half-transparent and half-reflective surface 124 from left to right on the display surface of the optical waveguide body 121 can be set to be 47 mm.

For example, types and specific settings of the image acquisition device 131 can be set according to specific implementation demands, and no limitations will be given to the embodiment of present disclosure in this respect. For example, the image acquisition device 131 can be a CCD or a CMOS type camera, but the embodiment of present disclosure is not limited to this case.

For example, the image acquisition device 131 can be arranged at the display side 161 of the image display device 110, for example, the light collecting surface of the image acquisition device 131 can face toward the opposite side 162 of the image display device 110. For example, the setting position of the image acquisition device 131 with respect to the length direction and the width direction of the optical waveguide body 121 can be set according to specific implementation demands provided that the image acquisition device 131 is allowed to simultaneously acquire the surrounding image and the first image, and no limitations will be given to the embodiment of present disclosure in this respect.

For example, in order to allow the display system 100 to be more compact, the light collecting surface of the image acquisition device 131 can be arranged at the display side 161 and to be opposite to one end of the optical waveguide body 121 (for example, the second end 126), for example, the light collecting surface of the image acquisition device 131 can be arranged at the display side and to be opposite to the half-transparent and half-reflective surface 124 closer to the second end 126 (for example, the rightmost half-transparent and half-reflective surface 124 illustrated in FIG. 2(a)). For example, according to specific implementation demands, the position of the image acquisition device 131 with respect to the width direction of the optical waveguide body 121 can be a position that is closer to the upper end of the second end 126 of the optical waveguide body 121, but the embodiment of present disclosure is not limited to this case. For example, according to the angle of the light outputted to the display side 161 of the image display device 110, the light collecting surface of the image acquisition device 131 and the display surface of the image display device 110 can be parallel to each other or can have a certain angle therebetween, and no limitations will be given to the embodiment of present disclosure in this respect.

For example, the light collecting surface of the image acquisition device 131 can be in tight contact with the surface of the image display device 110 at the opposite side 162, such that no stray light can be incident onto the light collecting surface of the image acquisition device 131 and thus the signal-to-noise ratio of the acquired image can be increased. For another example, the light collecting surface of the image acquisition device 131 and the surface of the image display device 110 at the opposite side 162 can also be spaced apart from each other by a spacing, and an optical system (not illustrated in FIG. 2(a)) can be further provided between the light collecting surface of the image acquisition device 131 and the surface of the image display device 110 at the opposite side 162, such that an image acquisition device 131 with a relatively small light collection surface can be adopted to obtain more information of the first image and the surrounding image (for example, obtaining the entire first image and surrounding image), and therefore, the cost of the image acquisition device 131 can be reduced while ensuring the effect of fusion of virtual and actual reality.

For example, the display system 100 can further comprise an calibration device 134, and the calibration device 134 can be implemented through a software, a hardware, a firmware or any combination of them, and can be realized based on the following descriptions, but details of implementation methods (for example, software programming, FPGA programming, or the like) will not be given herein. For example, the calibration device 134 can be connected with related components of the display system 100 (for example, the image acquisition device 131) through a wired or wireless manner. For another example, the calibration device 134 also can be equipped by the user according to implementation demands, for example, the functions of the calibration device 134 can be realized by an existing mobile electronic product (for example, cellphone) of the user.

For example, the calibration device 134 can be configured to obtain the matching information according to the surrounding image and the first image acquired by the image acquisition device 131. For example, the calibration device 134 can be configured to obtain the information regarding the scene object in the surrounding image and the information regarding image object in the first image (for example, to obtain the object through edge detection algorithm or contour extraction algorithm, and then to obtain information, such as size, location, profile, brightness, color and the like, of the object) and to obtain the matching information (for example, the distance between the scene object and the image object) according to the information regarding the scene object and the information regarding the image object. For example, specific methods for the calibration device 134 to obtain the matching information between the surrounding image and the first image can refer to a scene recognition and tracking registration technology for mobile augmented reality, and no further descriptions will be given to the embodiment of present disclosure.

For example, the display system 100 can further comprise an image processing device 135, the image processing device 135 can be implemented through a software, a hardware, a firmware or any combination of them, and can be realized based on the following descriptions, but details of implementation methods (for example, software programming, FPGA programming, or the like) will not be given here.

For example, the image processing device 135 can be configured to output an image display signal for the display element 133, for example, the image processing device 135 can output the image display signal for the display element 133 according to the matching information obtained by the calibration device 134 and the first image to be displayed. For example, the image processing device 135 can be configured to drive the display element 133 to display the first image, and can be further configured to drive the display element 133 to refresh the first image according to the matching information. For example, in the case that the information regarding the scene object in the surrounding image obtained by the calibration device 134 and the information regarding the image object in the first image fail to match with each other, the image processing device 135 can render the first image again (for example, can change the display position, on the image display device 110, of the image object in the first image or change the size, with respect to the image display device 110, of the image object in the first image) according to the matching information obtained by the calibration device 134, such that the position information of the scene object in the surrounding image match the image object in the first image to a higher degree, and the effect of fusion of the images displayed by the display system 100 and the surrounding image for the outside scene can be improved.

For example, the display system 100 can further comprise a controller 136, the controller 136 can be implemented through a software, a hardware, a firmware or any combination of them, and can be realized based on the following descriptions, but details of implementation methods (for example, software programming, FPGA programming, or the like) will not be given here. For example, the controller 136 can be configured to control the first image outputted to the optical waveguide element 120 according to the matching information. For example, the controller 136 can be configured to control the image display signal outputted by the image processing device 135 according to the matching information, and then control the first image displayed by the display element 133 according to the image display signal, such that the first image outputted to the optical waveguide element 120 can be controlled.

For example, types, positions and setting means of the display element 133 can be set according to specific implementation demands, and no limitations will be given to the embodiment of present disclosure in this respect. For example, the display element 133 can be a kind of micro-display (for example, an organic light-emitting diode display device, a silicon-based micro-display or a liquid crystal display device, and the like). For example, as illustrated in FIG. 2(*a*), the display element 133 can be a component of the display system 100. For example, according to specific implementation demands, the display element 133 can be arranged at the display side 161 or the opposite side 162 of the image display device 110, and no limitations will be given to the embodiment of present disclosure in this respect. For example, in order to allow the display system 100 to be more compact, the display element 133 can be arranged at one end of the optical waveguide element 120 (for example, the first end of the optical waveguide body 121), but the embodiment of present disclosure is not limited to this case. For another example, in order to allow customization and cost reduction for the display system 100, the display element 133 can also be equipped by the user, for example, in order to improve the display effect, mounting parts (for example, a mounting slot) used for allowing the user to mount the display element 133 can be set at a pre-determined position of the display system 100. For example, the above-mentioned mounting slot can be set at the display side 161 or the opposite side 162 of the image display device 110.

For example, the display system 100 can further comprise a projection device 132, and the projection device 132 can be configured to transmit the first image so as to allow the light of the first image to be outputted into the optical waveguide element 120. For example, the projection device 132 can be configured to collimate the light of the first image outputted by the display element 133 into parallel light, and then transmit the light of the first image into the optical waveguide element 120. For example, the parallel light collimated by the projection device 132 can be incident onto the light incident surface of the optical waveguide element 120 perpendicularly. For another example, the parallel light collimated by the projection device 132 also can be incident onto the light incident surface of the optical waveguide element 120 at a certain angle, and the incident angle of the parallel light can be set according to specific implementation demands, provided that the propagation angle of the parallel light after being reflected by the image import structure 122 satisfies the total reflection condition of the optical waveguide body 121, and no limitations will be given to the embodiment of present disclosure in this respect. For example, the projection device 132 also can be configured to collimate the light of the first image outputted by the display element 133 into a plurality of groups (for example, three groups) of light with the light in each group being parallel to each other, and then allow the light of the first image to be outputted to the optical waveguide element 120. For example, the projection device 132 and the display element 133 can be two separate elements. For another example, the projection device 132 and the display element 133 also can be integrated as one element, and no limitations will be given to the embodiment of present disclosure in this respect. For example, the image processing device 133 can also be a separate component in the display system 100, and also can be integrated as one element with the projection device 132 and the display element 133, and no limitations will be given to the embodiment of present disclosure in this respect.

Figure 4:
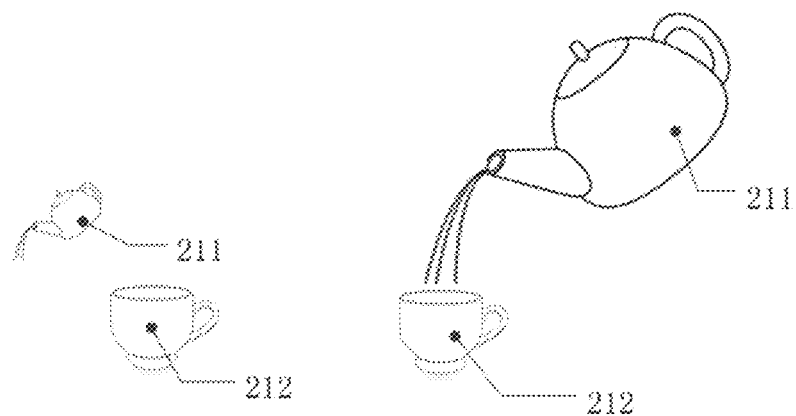
FIG. 4 is an application scene diagram of a display system provided by an embodiment of present disclosure.

For example, FIG. 4 is an application scene diagram of a display system 100 provided by an embodiment of present disclosure. For example, a cup 212 is a real object in the outside scene, while a tea pot 211 is a virtual object displayed by the display system 100. The tea pot 211 and the cup 212 illustrated in left side of FIG. 4 is the image observed by the user in the case that the image acquisition device 131 and the calibration device 134 do not work, and obvious misalignment in position and size exists between the tea pot 211 and the cup 212 that are observed by the user; the tea pot 211 and the cup 212 illustrated in right side of FIG. 4 is the image observed by the user in the case that the image acquisition device 131 and the calibration device 134 work in a normal way, and both of the position matching degree and the size matching degree between the tea pot 211 and the cup 212 observed by the user are good.

For example, for the display system 100 of the embodiment of the present disclosure, firstly, the image display device 110 can display the first image (for example, the image including the tea pot 211 at the left side of FIG. 4); then, the image acquisition device 131 can simultaneously acquire the first image and the surrounding image (for example, the image including the cup 212 at the left side of FIG. 4) at the display side 161, and can transfer the acquired image to the calibration device 134; later, the calibration device 134 (for example, can be a component of the display system 100) can extract the image object (for example, the tea pot 211 at the left side of FIG. 4) and the scene object (for example, the cup 212 at the left side of FIG. 4) in the image through, for example, contour extraction, and thus information (for example, the size and the position) of the image object (for example, the tea pot 211) and the scene object (for example, the cup 212) can be obtained, and the matching information of the image object and the scene object (for example, the size of the image object is small and the position of the image object is more to the left) can be obtained through comparing the information regarding the image object and scene object; finally, the image processing unit can regenerate the image display signal (for example, under the control of the controller 136) according to the above-mentioned matching information, and allow the display element 133 to refresh the first image, and therefore the user can observe the tea pot 211 and the cup 212 illustrated in the right side of FIG. 4, such that the effect of fusion of virtual and actual reality of the display system 100 can be improved.

For example, because the user wearing the display system 100 or/and the scene object can be moved over time, the image acquisition device 131 can monitor the matching degree between the surrounding image and the first image in real time, so as to obtain the matching information in real time; the image display device 110 (and the display element 133) can refresh the displayed image in real time, so as to improve the matching degree between the first image and the surrounding image. For example, the frequency for monitoring the matching degree between the surrounding image and the first image of the image acquisition device 131 and the frequency for refreshing the image displayed by the image display device 110 can be set according to application scenes. For example, in the case that relative large velocity difference exists between the user and the scene object (for example, one of the user and the scene object is move quickly, or the user and the scene object are moved toward opposite directions), the monitoring frequency of the image acquisition device 131 and the image refreshing frequency of the image display device 110 (and the display element 133) need to be large to achieve good effect of fusion of virtual and actual reality; and in the case that the user and the scene object are stationary with respect to each other, or the velocity difference between the user and the scene object are relatively small (for example, the user and the scene object are stationary, or have the same moving direction and velocity). The monitoring frequency of the image acquisition device 131 and the image refresh frequency of the image display device 110 can be set to be a relative small value, such that the power consumption of the display system 100 can be decreased.

For example, according to specific implementation demands, before the image display device 110 displays the first image, the image acquisition device 131 can also acquire the surrounding image for the scene, the image processing device 135 can drive the display element 133 to display the first image according to related information (for example, size, position, profile, brightness, color and the like) of the surrounding image, such that the first frame of image displayed by the display system 100 can also have good matching degree, and the effect of fusion of virtual and actual reality can be further improved.

Figure 5:
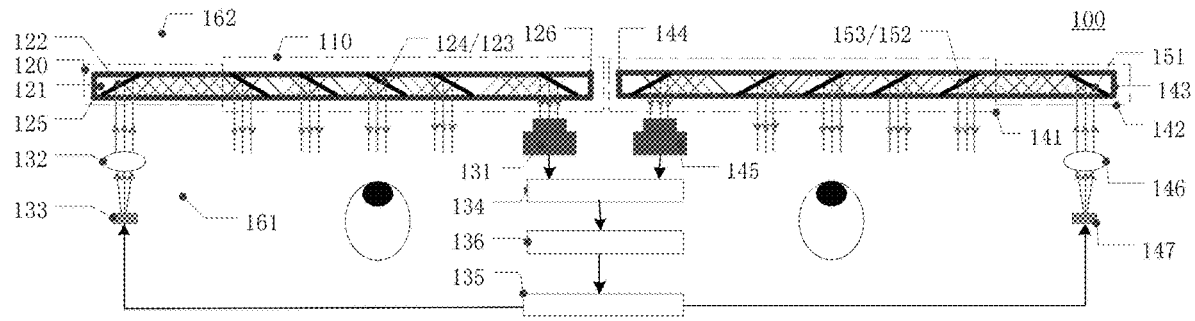
FIG. 5 is a cross-sectional view of another display system provided by an embodiment of present disclosure.

For example, FIG. 5 is a cross-sectional view of another display system provided by an embodiment of present disclosure. For example, compare to the display system 100 illustrated in FIG. 2(*a*), the display system 100 illustrated in FIG. 5 can further comprise a second image display device 141 and a second optical waveguide element 142, and the second image display device 141 and the second optical waveguide element 142 also can be combined with each other, or integrally-formed, so as to obtain a second optical waveguide body illustrated in the right side of FIG. 5. For example, another display system 100 provided by an embodiment of present disclosure can be implemented as a binocular type augmented reality glasses. For example, the image display device 110 and the second image display device 141 can respectively correspond to the left eye and the right eye of the same user.

For example, the second optical waveguide element 142 can comprise a second image import structure 151, and the second image display device 141 can comprise a second image export structure 152, in which the second image export structure 152 can comprise at least two second half-transparent and half-reflective surface 153, and the second image import structure 151 and the second image export structure 152 can be arranged in the second optical waveguide body. For example, settings of the second image import structure 151, the second image export structure 152 and the second half-transparent and half-reflective surface 153 can refer to the image import structure 122, the second image export structure 123 and the half-transparent and half-reflective surface 124, and no further descriptions will be given here.

For example, the second image display device 141 can comprise a display side, and an opposite side that is opposite to the display side, for example, the display side and the opposite side of the second image display device 141 can respectively correspond to the display side 161 and the opposite side 162 of the image display device 110. For example, at least part of the second image display device 141 can be configured to partially transparent at least, so as to receive at least part of the surrounding image for the opposite side of the second image display device 141. For example, specific settings and related descriptions of the second image display device 141 can refer to the image display device 110, and no further descriptions will be given here for repeated contents.

For example, the second optical waveguide element 142 can be configured to receive the light of the second image. For example, the second image can be generated by the second display element 147, and outputted into the second optical waveguide element 142 through the second projection device 146. For example, the second display element 147 and the second projection device 146 can be components of the display system 100 or can be equipped by the user. Specific settings and related descriptions of the second display element 147 and the second projection device 146 can refer to the display element 133 and the projection device 132, and no further descriptions will be given here for repeated contents.

For example, the second image and the first image can be same or different, and no limitations will be given to the embodiment of present disclosure in this respect. For example, in the case that the second image and the first image are the same, the user can observe a virtual 2D image; for another example, in the case that the second image and the first image belong to a pair of images with parallax, the user can observe a virtual 3D image, such that the effect of fusion of virtual and actual reality can be further improved. For example, the second optical waveguide element 142 can transmit the light of the second image to the second image display device 141, such that the second image display device 141 can display the second image at the display side. For example, concrete structures and setting of the second optical waveguide element 142 and the second image display device 141 can refer to the optical waveguide element 120 and the image display device 110, and no further descriptions will be given here for repeated contents.

For example, the second optical waveguide body can comprise a first end 143 (for example, the right end of the second optical waveguide element 142 in FIG. 5) and a second end 144 (for example, the left end of the second image display device 141 in FIG. 5). For example, the optical waveguide body 121 and the second optical waveguide body are arranged in parallel along the direction that the first end 125 of the optical waveguide body 121 and the second end 126 of the optical waveguide body 121 are connected, such that the image display device 110 and the second image display device 141 are adjacent to each other and arranged in parallel, and the second end 126 of the optical waveguide body 121 and the second end 144 of the second optical waveguide body are opposite to each other.

For example, the method for collimating the surrounding image and the second image outputted to the display side of the second image display device 141 can be chosen according to specific implementation demands, and no limitations will be given to the embodiment of present disclosure in this respect.

For example, in the case that the position relationship between the optical waveguide body 121 and the second optical waveguide body is relatively unchanged, the second image displayed by the second image display device 141 can be refreshed according to the matching information between the surrounding image and the first image outputted to the display side 161 of the image display device 110, such that the calibration between the surrounding image and the second image outputted to the display side of the second image display device 141 can be realized. For another example, in the case that the light collecting surface of the image acquisition device 131 is relatively large, the image acquisition device 131 can be set to correspond to the second end 126 of the optical waveguide body 121 and the second end 144 of the second optical waveguide body, such that the image acquisition device can simultaneously acquiring the surrounding image and the first image outputted to the display side 161 of the image display device 110 and the surrounding image and the second image outputted to the display side of the second image display device 141. For example, firstly, the calibration device 134 can obtain the scene object, the first image object and the second image object through, for example, contour extraction algorithm; and then, from which one of the image display device 110 or the second image display device 141 each object is output can be determined according to the information of the object (position, shape or size); finally, the matching degree between the scene object and the first image object outputted from the image display device 110 and the matching degree between the scene object and the second image object outputted from the second image display device 141 can be respectively determined, such that the above-mentioned method can obtain the matching information of two image display device in the case that only one image acquisition device is used, such that the effect of fusion of virtual and actual reality of the display system 100 can be improved. For example, in the above-mentioned two cases, provision of two image acquisition device can be avoided, and the cost of the display system 100 can be reduced.

For further another example, as illustrated in FIG. 5, the display system 100 can further comprise a second image acquisition device 145, the second image acquisition device 145 can be arranged at a position corresponding to the second end 144 of the second optical waveguide body, and is configured to be capable of simultaneously acquiring the surrounding image and the second image outputted to the display side of the second image display device 141. For example, the light collection surface of the second image acquisition device 145 can be arranged at the display side and to be opposite to the second end 144 of the second optical waveguide body. For example, specific settings and related descriptions of the second image acquisition device 145 can refer to the image acquisition device 131, and no further descriptions will be given here.

For example, the second image display device 141 of another display system 100 provided by an embodiment of present disclosure can adopt the calibration device 134, the controller 136 and the image processing device 135 corresponding to the image display device 110 to realize functions such as the image calibration, the image rendering and the like. For another example, another display system 100 provided by an embodiment of present disclosure can further comprise a second calibration device, a second controller and a second image processing device. For example, settings and related descriptions of the second calibration device, the second controller and the second image processing device can refer to the calibration device 134, the controller 136 and the image processing device 135, and no further descriptions will be given here. For example, the second calibration device and the calibration device 134 can be two separated devices or integrated together into a single device, and no limitations will be given to the embodiment of present disclosure in this respect. For example, the second controller and the controller 136 can be two separated devices or integrated together into a single device, and no limitations will be given to the embodiment of present disclosure in this respect. For example, the second image processing device and the image processing device 135 can be two separated devices or integrated together into a single device, and no limitations will be given to the embodiment of present disclosure in this respect.

At least one embodiment of present disclosure provides an image display method, the image display method comprises: receiving light of a first image, and transmit the light of the first image to a display side; allowing light of the surrounding image for an opposite side to be capable of being outputted at the display side through transmission of light; and simultaneously acquiring the surrounding image and the first image at the display side.

Figure 6:
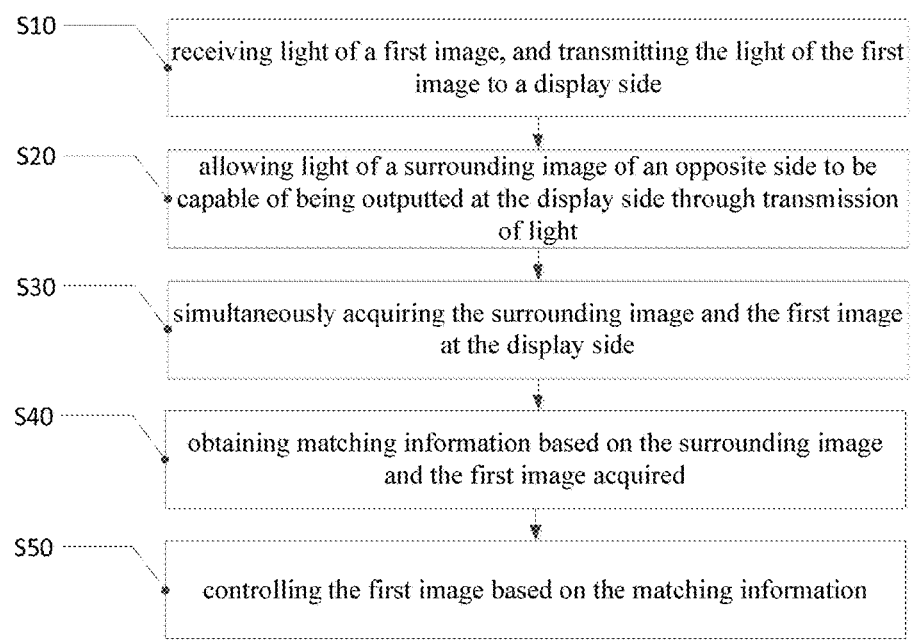
FIG. 6 is an exemplary flow chart of an image display method provided by another embodiment of present disclosure.

For example, FIG. 6 is an exemplary flow chart of an image display method provided by another embodiment of present disclosure. For example, as illustrated in FIG. 6, the image display method can comprise the following steps:

Step S10: receiving light of a first image, and transmitting the light of the first image to a display side;

Step S20: allowing light of a surrounding image for an opposite side to be capable of being outputted at the display side through transmission of light; and Step S30: simultaneously acquiring the surrounding image and the first image at the display side.

For example, as illustrated in FIG. 6, the image display method can further comprise the following steps:

Step S40: obtaining matching information based on the surrounding image and the first image that are acquired; and Step S50: controlling the first image based on the matching information.

For example, the image display method can improves the effect of fusion of the displayed images and the outside scene through simultaneously acquiring the surrounding image and the first image. For example, specific implementation methods of the step S10-S50 for the image display method can refer to the display system provided by an embodiment of present disclosure, and no further descriptions will be given herein.

Although detailed description has been given above to the present disclosure with general description and embodiments, it shall be apparent to those skilled in the art that some modifications or improvements may be made on the basis of the embodiments of the present disclosure. Therefore, all the modifications or improvements made without departing from the spirit of the present disclosure shall all fall within the scope of protection of the present disclosure.

What are described above is related to the illustrative embodiments of the disclosure only and not limitative to the scope of the disclosure; the scopes of the disclosure are defined by the accompanying claims.

The application claims priority to Chinese patent application No. 201710296328.6, filed on Apr. 28, 2017, the entire disclosure of which is incorporated herein by reference as part of the present application.

What is claimed is:

1. A display system comprising: an image display device, an image acquisition device and a calibration device,
    wherein at least part of the image display device is configured to be at least partially transparent, so as to at least partially receive a surrounding image for an opposite side of the image display device at a display side of the image display device;
    the image display device is further configured to display a first image received by the image display device at the display side;
    the image acquisition device is provided at the display side of the image display device, and is configured to be capable of simultaneously acquiring the surrounding image and the first image;
    the calibration device is configured to obtain matching information based on the surrounding image and the first image acquired by the image acquisition device;
    the display system further comprises an optical waveguide element; and
    the optical waveguide element is configured to receive light of the first image, transmit the light of the first image to the image display device, so as to allow the image display device to display the first image at the display side; and
    the calibration device is configured to obtain information regarding scene object in the surrounding image and information regarding image object in the first image, and obtain the matching information based on the information regarding the scene object and the information regarding the image object.

2. The display system according to claim 1, further comprising a projection device, wherein the projection device is configured to transmit the first image so as to allow the light of the first image is outputted into the optical waveguide element.

3. The display system according to claim 2, further comprising a display element, wherein the projection device is configured to collimate the light of the first image outputted by the display element into parallel light, and then transmit the light of the first image into the optical waveguide element.

4. The display system according to claim 3, further comprising an image processing device, wherein the image processing device is configured to output an image display signal for the display element.

5. The display system according to claim 4, wherein the image processing device is configured to drive the display element to display the first image, and is further configured to drive the display element to refresh the first image based on the matching information.

6. The display system according to claim 4, further comprising a controller, wherein the controller is configured to control the first image outputted into the optical waveguide element according to the matching information.

7. The display system according to claim 6, wherein the controller is configured to control the image display signal outputted by the image processing device according to the matching information, and to control the first image displayed by the display element according to the image display signal, so as to control the first image outputted into the optical waveguide element.

8. The display system according to claim 1, wherein
the optical waveguide element and the image display device are combined with each other, or integrally formed, so as to obtain an optical waveguide body;
the optical waveguide element comprises an image import structure, the image display device comprises an image export structure; and
the optical waveguide body comprises a first end and a second end, and the image import structure and the image export structure are arranged in the optical waveguide body.

9. The display system according to claim 8, wherein the image import structure is configured to allow a propagation angle of the light of the first image to satisfy total reflection condition of the optical waveguide body.

10. The display system according to claim 8, wherein the image import structure is arranged in the first end of the optical waveguide body, and is configured to import the light of the first image into the optical waveguide body by reflection.

11. The display system according to claim 8, wherein the image export structure comprises a plurality of half-transparent and half-reflective surfaces arranged in parallel.

12. The display system according to claim 11, wherein reflectivity of the plurality of half-transparent and half-reflective surfaces are increased sequentially, and reflectivity of the half-transparent and half-reflective surface closer to the second end is larger than reflectivity of the half-transparent and half-reflective surface closer to the first end.

13. The display system according to claim 12, wherein the image acquisition device is arranged a position at the display side and corresponding to the second end of the optical waveguide body, and is opposite to the half-transparent and half-reflective surface closer to the second end.

14. The display system according to claim 1, further comprising a second image display device and a second optical waveguide element,
wherein at least part of the second image display device is configured to be at least partially transparent, so as to at least partially receive a surrounding image for an opposite side of the second image display device; and
the second optical waveguide element is configured to receive light of the second image, and transmit the light of the second image to the second image display device, so as to allow the second image display device to display the second image at the display side.

15. The display system according to claim 14, wherein the image display device and the second image display device are adjacent to each other and arranged in parallel.

16. The display system according to claim 14, further comprising a second image acquisition device, wherein the second image acquisition device is arranged at a display side of the second image display device, and is configured to be capable of simultaneously acquiring the surrounding image and the second image, which are outputted to the display side of the second image display device.

17. An image display method, comprising:
receiving light of a first image, and transmitting the light of the first image to a display side;
allowing light of a surrounding image for an opposite side to be capable of being outputted at the display side through transmission of light;
simultaneously acquiring the surrounding image and the first image at the display side;
obtaining information regarding scene object in the surrounding image and information regarding image object in the first image;
obtaining matching information bases on the information regarding the scene object and the information regarding the image object; and
controlling the first image based on the matching information.

18. A display system, comprising: an image display device, an image acquisition device and a calibration device,
wherein at least part of the image display device is configured to be at least partially transparent, so as to at least partially receive a surrounding image for an opposite side of the image display device at a display side of the image display device;
the image display device is further configured to display a first image received by the image display device at the display side;
the image acquisition device is provided at the display side of the image display device, and is configured to be capable of simultaneously acquiring the surrounding image and the first image;
the calibration device is configured to obtain matching information based on the surrounding image and the first image acquired by the image acquisition device;
the display system further comprises an optical waveguide element;
the optical waveguide element is configured to receive light of the first image, and transmit the light of the first image to the image display device, so as to allow the image display device to display the first image at the display side;
the optical waveguide element and the image display device are combined with each other, or integrally formed, so as to obtain an optical waveguide body;
the optical waveguide element comprises an image import structure, the image display device comprises an image export structure;
the optical waveguide body comprises a first end and a second end, and the image import structure and the image export structure are arranged in the optical waveguide body;
the image export structure comprises a plurality of half-transparent and half-reflective surfaces arranged in parallel;
the image acquisition device is arranged a position at the display side and corresponding to the second end of the optical waveguide body, and is opposite to the half-transparent and half-reflective surface closer to the second end; and
the calibration device is configured to obtain information regarding scene object in the surrounding image and information regarding image object in the first image, and obtain the matching information based on the information regarding the scene object and the information regarding the image object.

* * * * *